(12) United States Patent
Erickson et al.

(10) Patent No.: US 11,648,731 B2
(45) Date of Patent: May 16, 2023

(54) FORMING THREE-DIMENSIONAL (3D) PRINTED ELECTRONICS

(71) Applicant: Hewlett-Packard Development Company, L.P., Houston, TX (US)

(72) Inventors: Kristopher J. Erickson, Palo Alto, CA (US); Thomas Anthony, Palo Alto, CA (US); Howard S. Tom, Palo Alto, CA (US); Sivapackia Ganapathiappan, Palo Alto, CA (US); Lihua Zhao, Palo Alto, CA (US); Krzysztof Nauka, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 497 days.

(21) Appl. No.: 15/763,200

(22) PCT Filed: Oct. 29, 2015

(86) PCT No.: PCT/US2015/058094
§ 371 (c)(1),
(2) Date: Mar. 26, 2018

(87) PCT Pub. No.: WO2017/074397
PCT Pub. Date: May 4, 2017

(65) Prior Publication Data
US 2018/0272601 A1 Sep. 27, 2018

(51) Int. Cl.
*B29C 64/00* (2017.01)
*B29C 64/165* (2017.01)
(Continued)

(52) U.S. Cl.
CPC ............ *B29C 64/165* (2017.08); *B22F 10/28* (2021.01); *B22F 10/50* (2021.01); *B29C 64/00* (2017.08);
(Continued)

(58) Field of Classification Search
CPC .............................. B29C 64/165; B33Y 10/00
See application file for complete search history.

(56) References Cited

U.S. PATENT DOCUMENTS 6,713,125 B1   3/2004   Sherwood et al.
7,766,641 B2   8/2010   Silverbrook
(Continued)

FOREIGN PATENT DOCUMENTS

EP   2182787        5/2010
JP   2007-535585   12/2007
(Continued)

OTHER PUBLICATIONS

Mirzaee, M., 2015. Developing novel 3D antennas using advanced additive manufacturing technology. (Year: 2015).*
(Continued)

*Primary Examiner* — Nicholas R Krasnow
(74) *Attorney, Agent, or Firm* — Shook, Hardy & Bacon L.L.P.

(57) ABSTRACT

In an example of a method for forming three-dimensional (3D) printed electronics, a build material is applied. A fusing agent is selectively applied on at least a portion of the build material. The build material is exposed to radiation and the portion of the build material in contact with the fusing agent fuses to form a layer. An electronic agent is selectively applied on at least a portion of the layer, which imparts an electronic property to the at least the portion of the layer.

13 Claims, 5 Drawing Sheets

(51) Int. Cl.
| | |
|---|---|
| *B33Y 50/02* | (2015.01) |
| *B33Y 10/00* | (2015.01) |
| *B33Y 70/00* | (2020.01) |
| *B33Y 80/00* | (2015.01) |
| *B29C 67/00* | (2017.01) |
| *C09B 47/06* | (2006.01) |
| *C09B 47/24* | (2006.01) |
| *C09B 47/067* | (2006.01) |
| *B33Y 40/00* | (2020.01) |
| *B29C 64/40* | (2017.01) |
| *B29C 64/176* | (2017.01) |
| *B29C 64/10* | (2017.01) |
| *B29C 64/182* | (2017.01) |
| *B33Y 99/00* | (2015.01) |
| *B29C 64/25* | (2017.01) |
| *B33Y 40/10* | (2020.01) |
| *B33Y 50/00* | (2015.01) |
| *B29C 64/205* | (2017.01) |
| *B29C 64/307* | (2017.01) |
| *B29C 64/245* | (2017.01) |
| *B33Y 40/20* | (2020.01) |
| *B29C 64/255* | (2017.01) |
| *B29C 64/30* | (2017.01) |
| *B29C 64/227* | (2017.01) |
| *B22F 10/28* | (2021.01) |
| *B22F 10/50* | (2021.01) |
| *B33Y 30/00* | (2015.01) |
| *B29C 64/20* | (2017.01) |
| *B29C 64/393* | (2017.01) |

(52) U.S. Cl.
CPC ............ *B29C 64/10* (2017.08); *B29C 64/176* (2017.08); *B29C 64/182* (2017.08); *B29C 64/20* (2017.08); *B29C 64/205* (2017.08); *B29C 64/227* (2017.08); *B29C 64/245* (2017.08); *B29C 64/25* (2017.08); *B29C 64/255* (2017.08); *B29C 64/30* (2017.08); *B29C 64/307* (2017.08); *B29C 64/393* (2017.08); *B29C 64/40* (2017.08); *B29C 67/00* (2013.01); *B33Y 10/00* (2014.12); *B33Y 30/00* (2014.12); *B33Y 40/00* (2014.12); *B33Y 40/10* (2020.01); *B33Y 40/20* (2020.01); *B33Y 50/00* (2014.12); *B33Y 50/02* (2014.12); *B33Y 70/00* (2014.12); *B33Y 80/00* (2014.12); *B33Y 99/00* (2014.12); *C09B 47/065* (2013.01); *C09B 47/0678* (2013.01); *C09B 47/24* (2013.01); *B22F 2999/00* (2013.01); *G03G 2215/2054* (2013.01); *G05B 2219/49023* (2013.01); *G05B 2219/49246* (2013.01); *Y10T 156/1722* (2015.01); *Y10T 156/1798* (2015.01)

(56) References Cited

U.S. PATENT DOCUMENTS

| | | | |
|---|---|---|---|
| 7,922,939 B2 | 4/2011 | Lewis et al. | |
| 8,158,032 B2 | 4/2012 | Liu et al. | |
| 8,563,348 B2 | 10/2013 | Harris et al. | |
| 2004/0232583 A1* | 11/2004 | Monsheimer | B29C 64/165 264/113 |
| 2007/0238056 A1* | 10/2007 | Baumann | B33Y 10/00 430/325 |
| 2007/0241482 A1* | 10/2007 | Giller | B29C 64/165 264/494 |
| 2007/0289483 A1 | 12/2007 | Cho et al. | |
| 2008/0105870 A1* | 5/2008 | Yu | H01L 45/00 257/E47.001 |
| 2010/0000441 A1 | 1/2010 | Jang et al. | |
| 2011/0203937 A1 | 8/2011 | Sidhu | |
| 2012/0111599 A1 | 5/2012 | Roberson et al. | |
| 2013/0127083 A1 | 5/2013 | Bobbitt, III | |
| 2013/0170171 A1 | 7/2013 | Wicker | |
| 2014/0252685 A1* | 9/2014 | Stacker | B29C 64/268 264/401 |
| 2015/0107877 A1 | 4/2015 | Van Der Burgt et al. | |
| 2015/0343673 A1* | 12/2015 | Williams | B29C 39/021 264/1.37 |
| 2016/0007474 A1* | 1/2016 | Dardona | H05B 3/06 219/543 |
| 2016/0120040 A1* | 4/2016 | Elmieh | G05B 19/4099 427/97.3 |
| 2016/0126502 A1* | 5/2016 | Furukawa | H01L 51/5268 257/40 |
| 2016/0242296 A1* | 8/2016 | DeAngelis | H05K 3/0005 |
| 2018/0265417 A1* | 9/2018 | Champion | C04B 35/62815 |

FOREIGN PATENT DOCUMENTS

| | | |
|---|---|---|
| JP | 2014-527474 | 10/2014 |
| WO | WO-2013-021173 | 2/2013 |
| WO | WO-2014/089708 | 6/2014 |
| WO | WO-2014/118783 | 8/2014 |
| WO | WO-2014/209994 | 12/2014 |
| WO | WO-2014/210584 | 12/2014 |
| WO | WO-2015136277 | 9/2015 |

OTHER PUBLICATIONS

Park 2007—http://nfml.yonsei.ac.kr/gnuboard4/data/file/publication/2776907207_aMcu16OG_2007-07_Thin-Solid-Films.pdf (Year: 2007).*

Johander, P., Haasl, S., Persson, K. and Harrysson, U., Oct. 2007. Layer manufacturing as a generic tool for microsystem integration. In Proceedings of the Third International Conference on Multi-Material Micro Manufacture, Borovets, Bulgaria (pp. 3-5). (Year: 2007).*

* cited by examiner

FORMING THREE-DIMENSIONAL (3D) PRINTED ELECTRONICS

BACKGROUND

Three-dimensional (3D) printing may be an additive printing process used to make three-dimensional solid parts from a digital model. 3D printing is often used in rapid product prototyping, mold generation, and mold master generation. 3D printing techniques are considered additive processes because they involve the application of successive layers of material. This is unlike traditional machining processes, which often rely upon the removal of material to create the final part. Materials used in 3D printing often require curing or fusing, which for some materials may be accomplished using heat-assisted sintering, and for other materials may be accomplished using digital light projection technology.

BRIEF DESCRIPTION OF THE DRAWINGS

Features of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

FIGS. 4A, 4D and 4E are cross-sectional views depicting still another example of the method for forming 3D printed electronics;

DETAILED DESCRIPTION

Figure 1A:
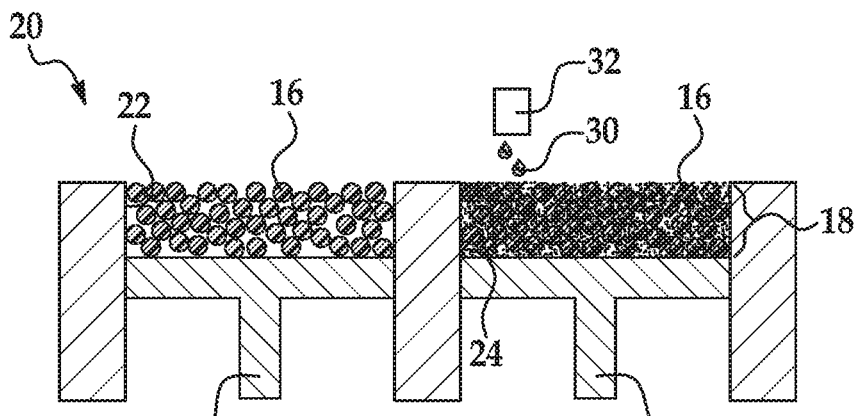
FIGS. 1A-1E are cross-sectional views depicting two examples of the method for forming three-dimensional (3D) printed electronics.

Building and/or embedding electronics on and/or within a dense part may require multiple steps to assemble several different components. For example, three-dimensional printing techniques, such as extrusion or additive manufacturing, have been used to create the dense part, and then other techniques, such as electroplating or the application of conducting materials, have been used to create the electronics. Many of the materials used to create the electronics require specific activation procedures, which may utilize specialized (e.g., proprietary, expensive, etc.) equipment, such as annealing equipment.

Examples of the three-dimensional (3D) printing method disclosed herein utilize multi jet fusion (MJF) to impart an electronic property within, and/or upon the surface of a layer of a 3D objects/parts at a voxel level.

During MJF, an entire layer or several layers of a build material (also referred to as build material particles) is/are exposed to electromagnetic radiation, but a selected region (in some instances less than the entire layer(s)) of the build material is fused and hardened to become a layer or several layers of a 3D object/part. A fusing agent is selectively deposited in contact with the selected region of the build material. The fusing agent(s) is/are capable of penetrating into the layer of the build material and spreading onto the exterior surface of the build material. This fusing agent is capable of absorbing electromagnetic radiation and converting the absorbed radiation to thermal energy, which in turn melts or sinters the build material that is in contact with the fusing agent. This causes the build material to fuse, bind, cure, etc. to form the layer of the 3D object/part.

In the examples disclosed herein, an electronic agent is also selectively deposited on the build material and/or on the layer of the 3D object/part to impart the electronic property within, and/or upon the surface of the layer of the 3D objects/parts at the voxel level. To impart the electronic property/properties, the MJF platform may be used without modification. This is due, in part, to the electronic agents being jettable via thermal and/or piezoelectric inkjet printheads. As such, no specialized electroplating or other deposition equipment is needed. In some instances, this is also due, in part, to the fact that the heat and light provided by the MJF process is suitable to anneal any of the material(s) that may be used to impart the electronic property. As such, no specialized equipment (e.g., annealing equipment) is needed. However, it is to be understood that off-bed annealing may also be utilized.

The method(s) disclosed herein also enable control over where the electronic property is introduced (e.g., at the voxel surface and/or through the voxel volume). By combining electronic voxels in a controlled fashion using MJF, a variety of devices with different electronic properties can be created. As examples, the methods disclosed herein may be used to form anti-static surface coatings (e.g., scratch-tolerant surface conductivity for static-related applications), capacitors, conductive traces, and more complex geometry electronic components.

The electronic property that is imparted to/on the object/part may be electrical conductivity, semi-conductivity, and/or an electrically insulating property. The electronic property may be imparted upon the build material by selectively depositing a suitable electronic agent on the build material. The electronic property may also be the property of at least a portion of an electronic component or feature that is formed on the surface of the layer of the 3D object/part by selectively depositing a suitable electronic agent on the layer.

It is to be understood that in the examples disclosed herein, a single electronic property or several electronic properties may be imparted to a single layer of build material and/or a single layer of the 3D object/part. As an example of the latter instance, to form a capacitor upon the surface of the layer of the 3D object/part, an electronic agent including a conductive material or a material whose electronic property is enhanced or activated when exposed to a treatment may be applied in a certain pattern on the layer, and then an electronic agent including an insulating material may be applied in a different area on the layer. As another example, to form a multi-layered structure (e.g., a capacitor, a via, etc.) in the build material or on the 3D object/part/layer, different electronic agents may be sequentially applied upon one another. In these types of structures, electrical continuity may be provided from one plane of electrically active material to another plane of electrically active material and then potentially on to subsequent planes. As an example, a first electronic agent may be selectively applied (on at least a portion of the build material or on an area of a 3D object/part/layer) to impart a first electronic property (e.g., conductivity) and then a second electronic agent may be selectively applied on the first electronic agent to impart a second electronic property (e.g., insulation) that is different than the first electronic property. It is to be understood that if the different electronic agents require different annealing conditions (e.g., no annealing and annealing, or annealing at different temperatures), then the electronic agents may be applied and annealed separately. If, however, the different electronic agents require similar annealing conditions, then the electronic agents can be selectively deposited and annealed together.

Figure 1B:
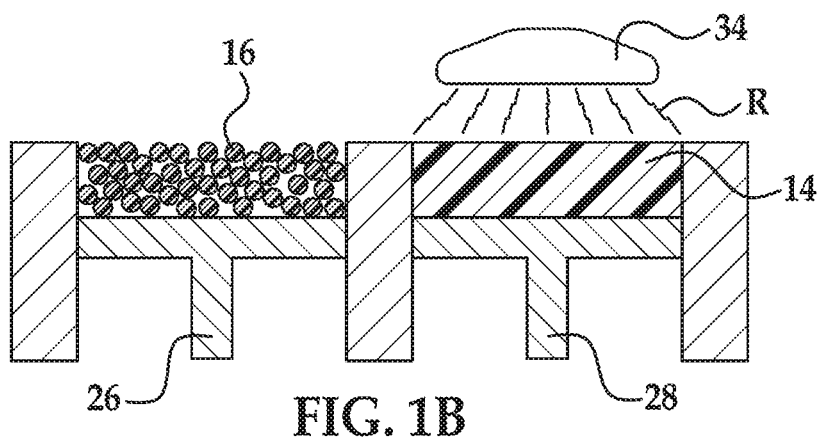
Figure 1C:
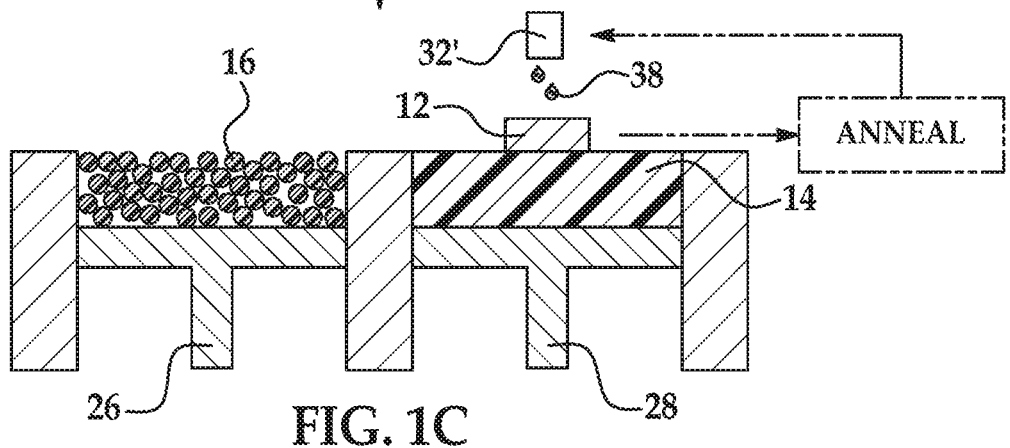
Figure 2:
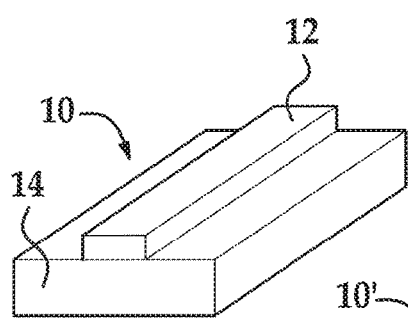
FIG. 2 is a perspective view depicting an example of a device with 3D printed electronics formed by the method shown in FIGS. 1A-1C.

Referring now to FIGS. 1A through 1C, one example of the method for forming 3D printed electronics is depicted. As shown in FIG. 2, in this example of the method, the electronic device 10 (3D object/part) that is formed includes an electronic component or feature 12 on the surface of a 3D printed layer 14.

Referring now to FIG. 1A, the method includes applying a build material 16. As depicted, one layer 18 of the build material 16 has been applied, as will be discussed in more detail below.

The build material 16 may be a powder, a liquid, a paste, or a gel. Examples of the build material 16 include semi-crystalline thermoplastic materials with a wide processing window of greater than 5° C. (i.e., the temperature range between the melting point and the re-crystallization temperature). Some specific examples of the build material 16 include polyamides (PAs) (e.g., PA 11/nylon 11, PA 12/nylon 12, PA 6/nylon 6, PA 8/nylon 8, PA 9/nylon 9, PA 66/nylon 66, PA 612/nylon 612, PA 812/nylon 812, PA 912/nylon 912, etc.). Other specific examples of the build material 16 include polyethylene, polyethylene terephthalate (PET), and an amorphous variation of these materials. Still other examples of suitable build materials 16 include polystyrene, polyacetals, polypropylene, polycarbonate, polyester, thermal polyurethanes, other engineering plastics, and blends of any two or more of the polymers listed herein. Core shell polymer particles of these materials may also be used.

Other examples of the build material 16 include ceramic particles.

Examples of suitable ceramic particles include oxides, carbides, and nitrides. Some specific examples include alumina ($Al_2O_3$), glass, silicon mononitride (SiN), silicon dioxide ($SiO_2$), zirconia ($ZrO_2$), titanium dioxide ($TiO_2$), or combinations thereof. As an example, 30 wt % glass may be mixed with 70 wt % alumina.

The build material 16 may have a melting point ranging from about 50° C. to about 2100° C. As examples, alumina particles having a melting point of 2072° C. may be used, glass having a melting point ranging from about 200° C. to about 1700° C. may be used, a polyamide having a melting point of 180° C. may be used, or thermal polyurethanes having a melting point ranging from about 100° C. to about 165° C. may be used.

The build material 16 may be made up of similarly sized particles or differently sized particles. In the examples shown herein, the build material 16 includes particles of two different sizes.

The term "size" or "particle size" is used herein to describe at least the build material 16. The size or particle size generally refers to the diameter or average diameter, which may vary, depending upon the morphology of the individual particle. In an example, the respective particle may have a morphology that is substantially spherical. A substantially spherical particle (i.e., spherical or near-spherical) has a sphericity of >0.84. Thus, any individual particles having a sphericity of <0.84 are considered non-spherical (irregularly shaped). The particle size of the substantially spherical particle may be provided by its largest diameter, and the particle size of a non-spherical particle may be provided by its average diameter (i.e., the average of multiple dimensions across the particle) or by an effective diameter, which is the diameter of a sphere with the same mass and density as the non-spherical particle.

In an example, the average size of the particles of the build material 16 ranges from about 1 μm to about 500 μm. In another example, the build material 16 is a particle having a particle size ranging from about 5 μm to less than 200 μm.

It is to be understood that build material 16 may include, in addition to the polymer or ceramic particles, a charging agent, a flow aid, or combinations thereof. Charging agent(s) may be added to suppress tribo-charging. Examples of suitable charging agent(s) include aliphatic amines (which may be ethoxylated), aliphatic amides, quatemary ammonium salts (e.g., behentrimonium chloride or cocamidopropyl betaine), esters of phosphoric acid, polyethylene glycol esters, or polyols. Some suitable commercially available charging agents include HOSTASTAT® FA 38 (natural based ethoxylated alkylamine), HOSTASTAT® FE2 (fatty acid ester), and HOSTASTAT® HS 1 (alkane sulfonate), each of which is available from Clariant Int. Ltd.). In an example, the charging agent is added in an amount ranging from greater than 0 wt % to less than 5 wt % based upon the total wt % of the build material 16.

Flow aid(s) may be added to improve the coating flowability of the build material 16. Flow aid(s) may be particularly desirable when the particles of the build material 16 are less than 25 μm in size. The flow aid improves the flowability of the build material 16 by reducing the friction, the lateral drag, and the tribocharge buildup (by increasing the particle conductivity). Examples of suitable flow aids include tricalcium phosphate (E341), powdered cellulose (E460(ii)), magnesium stearate (E470b), sodium bicarbonate (E500), sodium ferrocyanide (E535), potassium ferrocyanide (E536), calcium ferrocyanide (E538), bone phosphate (E542), sodium silicate (E550), silicon dioxide (E551), calcium silicate (E552), magnesium trisilicate (E553a), talcum powder (E553b), sodium aluminosilicate (E554), potassium aluminium silicate (E555), calcium aluminosilicate (E556), bentonite (E558), aluminium silicate (E559), stearic acid (E570), or polydimethylsiloxane (E900). In an example, the flow aid is added in an amount ranging from greater than 0 wt % to less than 5 wt % based upon the total wt % of the build material 16.

In the example shown in FIG. 1A, a printing system 20 for forming the device 10 includes a supply bed 22 (including a supply of the build material 16), a delivery piston 26, a roller (not shown), a fabrication bed 24, and a fabrication piston 28. Each of these physical elements may be operatively connected to a central processing unit (not shown) of the printing system 20 that controls the general operation of the additive printing system 20. As an example, the central processing unit may be a microprocessor-based controller that is coupled to a memory, for example via a communications bus (not shown). The memory stores the computer readable instructions 48. The central processing unit may execute the instructions and thus may control operation of the system 20 in accordance with the instructions. The central processing unit (e.g., running the computer readable instructions stored on a non-transitory, tangible computer readable storage medium) manipulates and transforms data represented as physical (electronic) quantities within the printer's registers and memories in order to control the physical elements to create the device 10. The data for the selective delivery of the build material 16, the fusing agent 30, the electronic agent 38, etc. may be derived from a model of the device to be formed. For example, the instructions may cause the controller to utilize a build material distributor to dispense the build material 16, and to utilize applicators (e.g., an inkjet applicator) to respectively and selectively dispense the fusing agent and the electronic agent to form a three-dimensional part having an electronic property.

The delivery piston 26 and the fabrication piston 28 may be the same type of piston, but are programmed to move in opposite directions. In an example, when a first layer of the 3D object is to be patterned or formed, the delivery piston 26 may be programmed to push a predetermined amount of the build material 16 out of the opening in the supply bed 22 and the fabrication piston 28 may be programmed to move in the opposite direction of the delivery piston 26 in order to increase the depth of the fabrication bed 24. The delivery piston 26 will advance enough so that when the roller pushes the build material 16 into the fabrication bed 24, the depth of the fabrication bed 24 is sufficient so that a layer 18 of the build material 16 may be formed in the bed 24. The roller is capable of spreading the build material 16 into the fabrication bed 24 to form the layer 18, which is relatively uniform in thickness. In an example, the thickness of the layer 18 ranges from about 90 µm to about 110 µm, although thinner or thicker layers may also be used. For example, the thickness of the layer 18 may range from about 50 µm to about 1 mm. In an example, the layer 18 thickness ranges from about 100 µm to about 200 µm.

It is to be understood that the roller is a build material distributor that may be replaced by other tools, such as a blade that may be desirable for spreading different types of powders, or a combination of a roller and a blade.

The supply bed 22 that is shown is one example, and could be replaced with another suitable delivery system to supply the build material 16 to the fabrication bed 24. Examples of other suitable delivery systems include a hopper, an auger conveyer, or the like.

The fabrication bed 22 that is shown is also one example, and could be replaced with another support member, such as a platen, a print bed, a glass plate, or another build surface.

After the layer 18 of the build material 16 is applied in the fabrication bed 24, the layer 18 may be exposed to heating (not shown). Heating may be performed to pre-heat the build material 16, and thus the heating temperature may be below the melting point of the build material 16. As such, the temperature selected will depend upon the build material 16 that is used. As examples, the heating temperature may be from about 5° C. to about 50° C. below the melting point of the build material 16.

Pre-heating the layer 18 of the build material 16 may be accomplished using any suitable heat source that exposes all of the build material 16 in the fabrication bed 24 to the heat. Examples of the heat source include a thermal heat source or an electromagnetic radiation source (e.g., infrared (IR), microwave, ultraviolet, etc.).

As shown in FIG. 1A, the method also includes selectively applying the fusing agent 30 on at least a portion of the build material 16. The fusing agent 30 may be dispensed from any suitable applicator. An example of the applicator is an inkjet printhead 32, such as a thermal inkjet printhead or a piezoelectric inkjet printhead. The printhead 32 may be a drop-on-demand printhead or a continuous drop printhead. The printhead 32 may be selected to deliver drops of the fusing agent 30 at a resolution ranging from about 300 dots per inch (DPI) to about 1200 DPI. In other examples, the printhead 32 may be selected to be able to deliver drops of the fusing agent 30 at a higher or lower resolution. The drop velocity may range from about 5 m/s to about 24 m/s and the firing frequency may range from about 1 kHz to about 100 kHz.

The printhead 32 may include an array of nozzles through which it is able to selectively eject drops of fluid. In one example, each drop may be in the order of about 10 pico liters (pl) per drop, although it is contemplated that a higher or lower drop size may be used. In some examples, printhead 32 is able to deliver variable size drops of the fusing agent 30.

The printhead 32 may be attached to a moving XY stage or a translational carriage (neither of which is shown) that moves the printhead 32 adjacent to the fabrication bed 24 in order to deposit the fusing agent 30 in desirable area(s). In other examples, the printhead 32 may be fixed while a support member (similar to the fabrication bed 24) is configured to move relative thereto. The printhead 32 may be programmed to receive commands from a central processing unit and to deposit the fusing agent 30 according to a pattern of a cross-section for the layer of the 3D object/part that is to be formed. As used herein, the cross-section of the layer of the part to be formed refers to the cross-section that is parallel to a contact surface of the fabrication bed 24.

In an example, the printhead 32 may have a length that enables it to span the whole width of the fabrication bed 24 in a page-wide array configuration. As used herein, the term 'width' generally denotes the shortest dimension in the plane parallel to the X and Y axes of the contact surface, and the term 'length' denotes the longest dimension in this plane. However, it is to be understood that in other examples, the term 'width' may be interchangeable with the term 'length'. In an example, the page-wide array configuration is achieved through a suitable arrangement of multiple printheads 32. This configuration may be desirable for single pass printing. In still other examples of the printing system 20, the printhead 32 may have a shorter length that does not enable them to span the whole width of the fabrication bed 24. In these other examples, the printhead 32 be movable bi-directionally across the width of the fabrication bed 24. This configuration enables selective delivery of the fusing agent 30 across the whole width and length of the fabrication bed 24 using multiple passes.

Examples of the fusing agent 30 are water-based dispersions including a radiation absorbing binding agent (i.e., an active material). The active material may be any infrared light absorbing colorant. In an example, the active material is a near infrared light absorber. Any near infrared colorants, e.g., those produced by Fabricolor, Eastman Kodak, or Yamamoto, may be used in the fusing agent 30. As one example, the fusing agent 30 may be an ink formulation including carbon black as the active material. Examples of this ink formulation are commercially known as CM997A, 516458, C18928, C93848, C93808, or the like, all of which are available from Hewlett-Packard Company. As another example, the fusing agent 30 may be an ink formulation including near infrared absorbing dyes as the active material. Examples of this ink formulation are described in U.S. Pat. No. 9,133,344, incorporated herein by reference in its entirety. Some examples of the near infrared absorbing dye are water soluble near infrared absorbing dyes selected from the group consisting of:

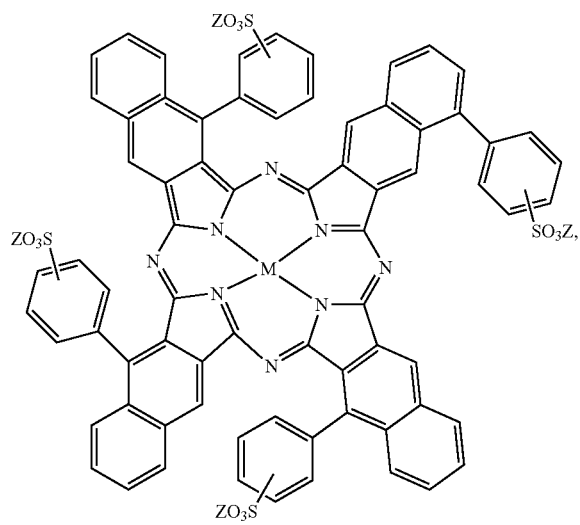
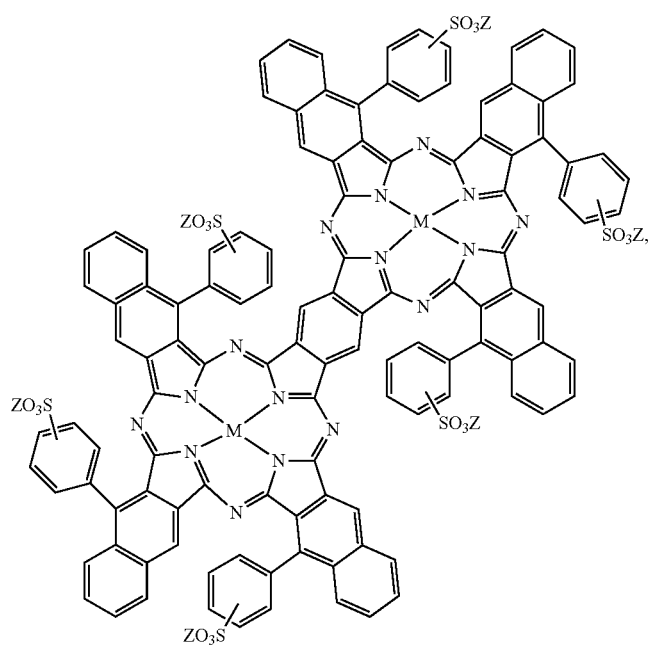

-continued

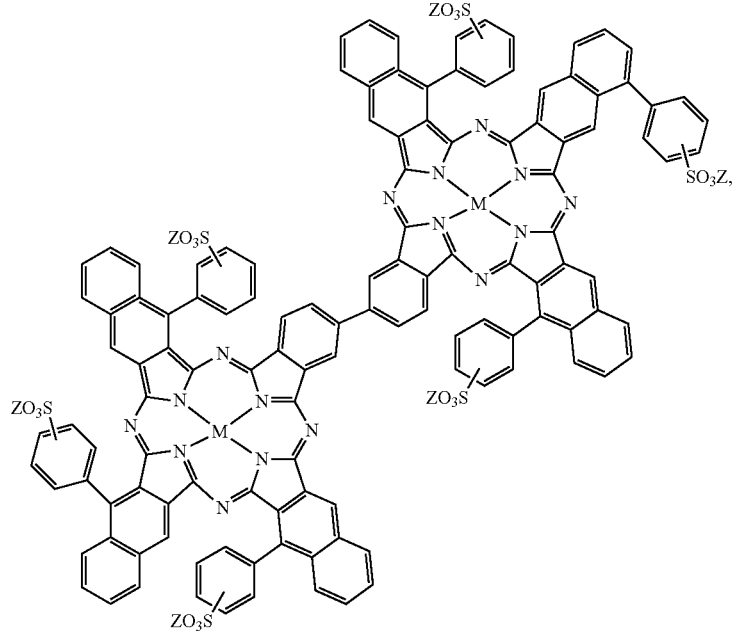

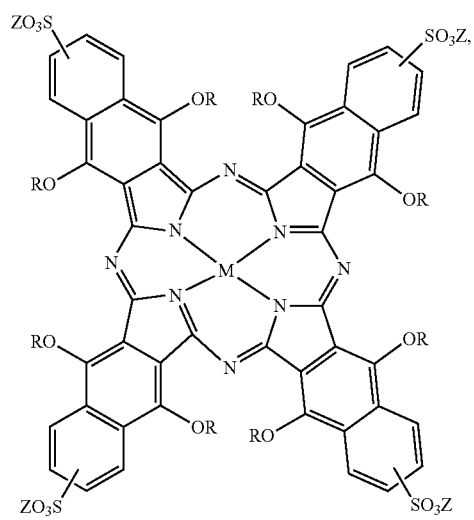

and mixtures thereof. In the above formulations, M can be a divalent metal atom (e.g., copper, etc.) or can have OSO₃Na axial groups filling any unfilled valencies if the metal is more than divalent (e.g., indium, etc.), R can be any C1-C8 alkyl group (including substituted alkyl and unsubstituted alkyl), and Z can be a counterion such that the overall charge of the near infrared absorbing dye is neutral. For example, the counterion can be sodium, lithium, potassium, NH₄⁺, etc.

Some other examples of the near infrared absorbing dye are hydrophobic near infrared absorbing dyes selected from the group consisting of:

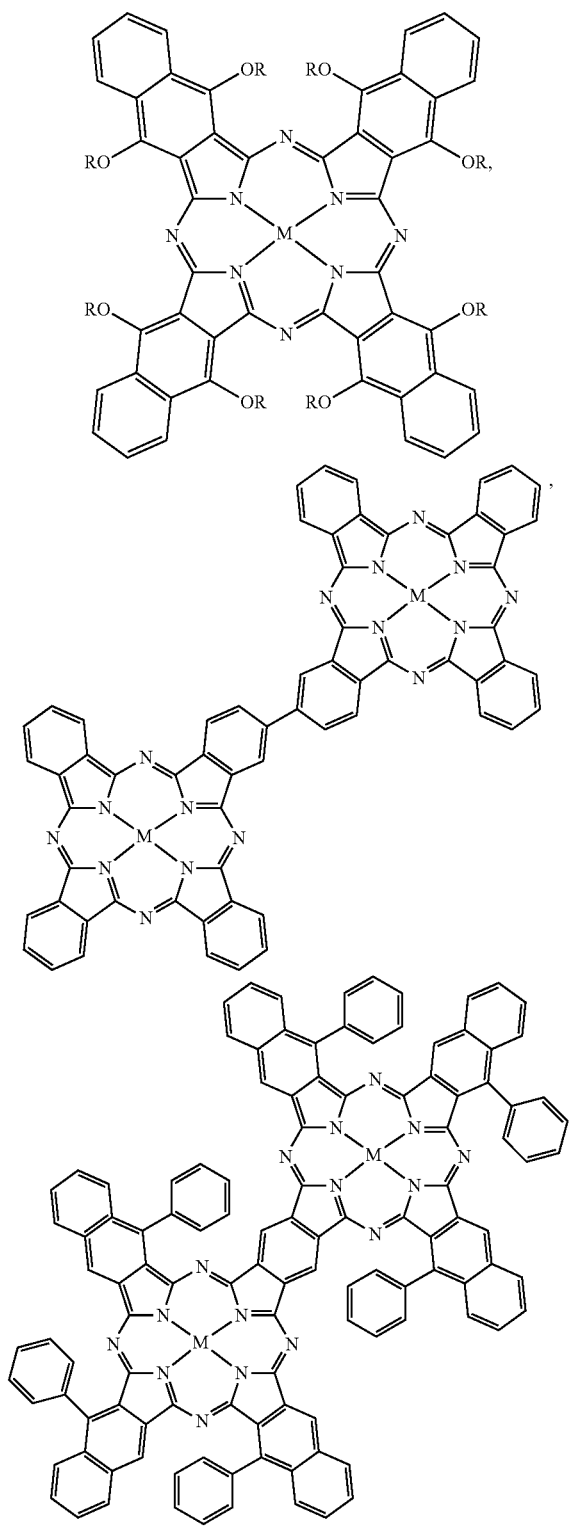

and mixtures thereof. For the hydrophobic near infrared absorbing dyes, M can be a divalent metal atom (e.g., copper, etc.) or can include a metal that has Cl, Br, or OR' (R'=H, $CH_3$, $COCH_3$, $COCH_2COOCH_3$, $COCH_2COCH_3$) axial groups filling any unfilled valencies if the metal is more than divalent, and R can be any C1-C8 alkyl group (including substituted alkyl and unsubstituted alkyl).

The aqueous nature of the fusing agent 30 enables the fusing agent 30 to penetrate, at least partially, into the layer 18 of the build material 16. The build material 16 may be hydrophobic, and the presence of a co-solvent and/or a surfactant in the fusing agent 30 may assist in obtaining a particular wetting behavior.

As shown in FIG. 1B, after the fusing agent 30 is selectively applied in the specific portion(s) of the layer 18, the entire layer 18 of the build material 16 is exposed to radiation R.

In an example, the electromagnetic radiation R may include wavelengths ranging from about 100 nm (UV) to about 10 μm. In yet another example, the electromagnetic radiation R wavelengths range from about 400 nm to about 3 μm or 4 μm (which includes near-infrared and mid-infrared radiation). As an example, the electromagnetic radiation 36 is blackbody radiation with a maximum intensity at a wavelength of about 1100 nm.

The radiation R is emitted from a radiation source 34, such as an IR (e.g., near-IR) curing lamp, a UV or UV-Vis curing lamp, IR (e.g., near-IR), UV, or visible light emitting diodes (LED), Vertical Cavity Surface Emitting Laser (VC-SEL) arrays, or lasers with specific wavelengths. Any radiation source 34 may be used that emits a suitable wavelength for the 3D printing process. The radiation source 34 may be attached, for example, to a carriage that also holds the printhead(s) 32. The carriage may move the radiation source 34 into a position that is adjacent to the fabrication bed 24. The radiation source 34 may be programmed to receive commands from the central processing unit and to expose the layer 18, including the fusing agent 30 and build material 16, to radiation R.

The length of time the radiation R is applied for, or energy exposure time, may be dependent, for example, on one or more of: characteristics of the radiation source 34; characteristics of the build material 16; and/or characteristics of the fusing agent 30.

The fusing agent 30 enhances the absorption of the radiation R, converts the absorbed radiation to thermal energy, and promotes the transfer of the thermal heat to the build material 16 in contact therewith. In an example, the fusing agent 30 sufficiently elevates the temperature of the build material 16 above the melting point(s), allowing curing (e.g., sintering, binding, fusing, etc.) of the build material particles to take place. Exposure to radiation R forms a layer 14 of the 3D object/part.

While not shown in FIG. 1B, it is to be understood that portions of the build material 16 that do not have the fusing agent 30 applied thereto do not absorb enough energy to fuse. Any unfused build material 16 may be removed from the layer 14 that is formed.

As shown in FIG. 1C, the method also includes selectively applying the electronic agent 38 on at least a portion of the build material 16. The electronic agent 38 may be used to impart an electronic property to the surface of the layer 14. In the example shown in FIG. 1C, the electronic agent 38 is selectively applied to form at least a portion of an electronic component 12 on the surface of the layer 14, where the electronic component 12 has the electronic property.

The electronic agent 38 may be an aqueous formulation that includes a conductive material, a material whose electronic property is enhanced or activated when exposed to a treatment, a semiconductive material, and/or an insulating material. The electronic agent may include one of the materials, or a combination of the materials in order to enhance the compatibility with a particular build material and/or to enhance the electronic property. For examples, the electronic agent 38 may include a combination of conductive materials to enhance the conductive electronic property, or may include a combination of a semiconductive material and an insulating material to modify the electronic property. Some specific examples of material combinations include: a combination of carbon nanotubes, silver nanoparticles and a PEDOT:PSS polymer to enhance conductive properties; a combination of quantum dots and semi-conducting polymers to enhance semi-conducting properties; a combination of insulating polymer and insulating nanoparticles to enhance insulating properties; and a combination of silver nanoparticles and carbon black to create an electronic feature with a specific conductivity, for instance, a resistor of specific resistance.

In addition to the electronic material, the aqueous formulation of the electronic agent 38 may also include water, a co-solvent, and/or a pH adjuster. As an example, conducting polymers may be incorporated into an aqueous formulation including water and a co-solvent. Other examples of the aqueous formulation may include a surfactant. As examples, carbonaceous nanomaterials and metal nanoparticles may be incorporated into an aqueous formulation including water, a co-solvent, and a surfactant.

Examples of the conductive materials include metallic (e.g., silver, copper, gold, platinum, palladium, tungsten, iron, etc.) nanomaterials (e.g., nanoparticles, nanorods, nanowires, nanotubes, nanosheets, etc.), conductive oxides (e.g., indium tin oxide, antimony oxide, zinc oxide, etc.), conducting polymers (e.g., poly(3,4-ethylenedioxythiophene) polystyrene sulfonate (PEDOT:PSS), polyacetylene, polythiophenes, any other conjugated polymer, etc.), carbonaceous nanomaterials (e.g., graphene (single or multilayer), carbon-nanotubes (CNTs, single or multi-walled), graphene nanoribbons, fullerenes, etc.), and reactive metal systems (e.g., metal oxide nanoparticles, which are reduced once deposited). Carbonaceous nanomaterials and metallic materials are stable at very high temperatures (i.e., at the sintering/processing temperatures for 3D printing polymers and ceramics, e.g., up to 3400° C.), and thus may be suitable for forming electronic component(s) 14 on and/or in ceramic build materials 16.

Examples of the semiconductive material include semiconducting nanomaterials (nanoparticles, nanorods, nanowires, nanotubes, nanosheets, etc.), semiconducting metal oxides (e.g., tin oxide, antimony oxide, indium oxide, etc.), semiconducting polymers (e.g., PEDOT:PSS, polythiophenes, poly(p-phenylene sulfide), polyanilines, poly(pyrrole)s, poly(acetylene)s, poly(p-phenylene vinylene), polyparaphenylene, any other conjugated polymer, etc.), and semiconducting small molecules (i.e., having a molecular mass less than 5,000 Daltons, e.g., rubrene, pentacene, anthracene, aromatic hydrocarbons, etc.). Some specific examples of the semiconducting nanomaterials include quantum dots, III-V or II-VI semiconductors, Si, Ge, transition metal dichalcogenides ($WS_2$, $WSe_2$, $MoSe_s$, etc.), graphene nanoribbons, semiconducting carbon nanotubes, and fullerenes and fullerene derivatives.

The nanoparticles may have weakly bound ligands at their surface. Weakly bound ligands include molecules that attach to the nanoparticle surface through an amine, carboxylic acid, or pyridine functional group. Examples of such molecules include dodecanoic acid, triethylenetetramine, or 4-dimethylaminopyridine.

The previously described fullerenes, conducting or semiconducting metal oxides, and conducting or semi-conducting polymers may be semi-conductive, in that they have a finite conductivity. However, this conductivity may often be sufficient for conductive applications. The material may be considered conductive or semi-conductive depending upon the geometry and/or in what combination with other electronic components it is utilized.

Some of the conductive or semiconductive materials are inherently electronically active or become electronically active after evaporation of the aqueous formulation. Others of the conductive or semiconductive materials have their electronic property enhanced or activated when exposed to a treatment. The treatment may be annealing or a chemical treatment (e.g., chemical interaction with another activating agent). In the examples disclosed herein, the activating agent may be contained in a separate fluid from electronic agent 38 (e.g., the fusing agent 30), and may be deposited before, after, or simultaneously with the electronic agent 28 to activate the material in the electronic agent 38.

Some examples of the material whose electronic property is enhanced or activated when exposed to a treatment may include conductive or semiconductive materials that become more electronically active following annealing (e.g., graphene, carbon nanotubes, $WS_2$, $WSe_2$, $MoSe_2$, graphene nanoribbons, fullerenes, and semiconducting metal oxides). A surfactant may be used to incorporate these materials into the electronic agent 38, and removal of the surfactant during annealing results in suitable electronic property/properties. Other examples of the material whose electronic property is enhanced or activated when exposed to a treatment may exhibit conductivity or semiconductivity after annealing or chemical treatment (e.g., metal nanoparticles, metal organic decomposition systems which become conductive following annealing or chemical treatment). Still other examples of the material whose electronic property is enhanced or activated when exposed to a treatment may include those materials that decompose into metallic features (e.g., metal salts). The decomposition may be initiated via heat, light, or chemical treatment (e.g., reduction).

Examples of the insulating (dielectric) material include insulating nanomaterials (nanoparticles, nanorods, nanowires, nanotubes, nanosheets, etc.), colloids, or sol-gel precursors, such as hexagonal boron nitride, metal and semiconducting oxides, metal and semiconducting nitrides, metal oxide sol-gel precursors (e.g., metal alkoxides, metal chlorides, etc.), silicon sol-gel precursors (silicates), or solid electrolytes. Other examples of the insulating material include insulating polymers (e.g., polylactic acid, fluoropolymers, polycarbonate, acrylics, polystyrene, SU-8, etc.) and insulating small molecules (i.e., having a molecular mass less than 5,000 Daltons, e.g., benzocyclobutane, paraffins, organic dyes, etc.).

As mentioned above, the aqueous formulation of the electronic agent 38 may include water, co-solvent(s), pH adjuster(s), and/or surfactant(s). The aqueous formulation may also include other additives, such as a biocide and/or an anti-kogation agent.

Examples of suitable co-solvents include 2-pyrrolidinone, N-methylpyrrolidone, 1-(2-hydroxyethyl)-2-pyrrolidinone, 1,6-hexanediol or other diols (e.g., 1,5-Pentanediol, 2-methyl-1,3-propanediol, etc.), triethylene glycol, tetraethylene glycol, tripropylene glycol methyl ether, or the like, or combinations thereof. Whether used alone or in combination, the total amount of the co-solvent(s) ranges from about 1 wt % to about 60 wt % of the total wt % of the electronic agent 38.

Examples of suitable surfactants include a self-emulsifiable, nonionic wetting agent based on acetylenic diol chemistry (e.g., SURFYNOL® SEF from Air Products and Chemicals, Inc.), a nonionic fluorosurfactant (e.g., CAPSTONE® fluorosurfactants from DuPont, previously known as ZONYL FSO), and combinations thereof. In other examples, the surfactant is an ethoxylated low-foam wetting agent (e.g., SURFYNOL® 440 or SURFYNOL® CT-111 from Air Products and Chemical Inc.) or an ethoxylated wetting agent and molecular defoamer (e.g., SURFYNOL@ 420 from Air Products and Chemical Inc.). Still other suitable surfactants include non-ionic wetting agents and molecular defoamers (e.g., SURFYNOL® 104E from Air Products and Chemical Inc.) or water-soluble, non-ionic surfactants (e.g., TERGITOL™ TMN-6 from The Dow Chemical Company). In some examples, it may be desirable to utilize a surfactant having a hydrophilic-lipophilic balance (HLB) less than 10.

Whether a single surfactant is used or a combination of surfactants is used, the total amount of surfactant(s) in the electronic agent 38 may range from about 0.5 wt. % to about 1.5 wt. % based on the total wt. % of the electronic agent 38.

pH adjusters may be used to control the pH of the electronic agent 38. From 0 wt % to about 2 wt % (of the total wt % of the electronic agent 38) of the pH adjuster, for example, can be used.

Examples of suitable biocides include an aqueous solution of 1,2-benzisothiazolin-3-one (e.g., PROXEL® GXL from Arch Chemicals, Inc.), quaternary ammonium compounds (e.g., BARDAC® 2250 and 2280, BARQUAT® 50-65B, and CARBOQUAT® 250-T, all from Lonza Ltd. Corp.), and an aqueous solution of methylisothiazolone (e.g., KORDEK® MLX from The Dow Chemical Co.). The biocide or antimicrobial may be added in any amount ranging from about 0.1 wt. % to about 5 wt. % with respect to the total wt. % of the electronic agent 38.

An anti-kogation agent may be included in the electronic agent 38. Kogation refers to the deposit of dried ink (e.g., electronic agent 38) on a heating element of a thermal inkjet printhead. Anti-kogation agent(s) is/are included to assist in preventing the buildup of kogation. Examples of suitable anti-kogation agents include oleth-3-phosphate (e.g., commercially available as CRODAFOS™ O3A or CRODAFOS™ N-3 acid from Croda), or a combination of oleth-3-phosphate and a low molecular weight (e.g., <5,000) polyacrylic acid polymer (e.g., commercially available as CARBOSPERSE™ K-7028 Polyacrylate from Lubrizol). Whether a single anti-kogation agent is used or a combination of anti-kogation agents is used, the total amount of anti-kogation agent(s) in the electronic agent 38 may range from about 0.1 wt. % to about 5 wt. % based on the total wt. % of the electronic agent 38.

The electronic agent 38 may also be dispensed from any suitable applicator, such as an inkjet printhead 32', similar to inkjet printhead 32. As shown in FIG. 1C, the electronic agent 38 may be applied on the surface of the layer 14 to form an electronic component 12, or a portion of the electronic agent 12 on the surface of the layer 14.

After the electronic agent 38 is selectively applied, the applied electronic agent 38 may be exposed to a subsequent treatment, such as annealing (as shown in phantom in FIG. 1C) or a chemical treatment (not shown). In other examples, the chemical treatment may be performed prior to the electronic agent 38 being selectively applied or while the electronic agent 38 is being selectively deposited.

Annealing may be used to accelerate evaporation of the aqueous formulation, to enhance the electronic property, and/or to activate the electronic property. It is to be understood that some electronic agents 38 have an aqueous formulation that evaporates upon being dispensed or by the heat of the fabrication bed 24, and also do not require property enhancement or activation, and thus the treatment may not be performed with all of the electronic agents 38. As an example, electronic agents 38 made with conducting polymers, such as PEDOT:PSS, involve solvent evaporation at a temperature of about 100° C. or less, but do not involve property enhancement or activation. Even in these instances, however, annealing may be performed in order to accelerate the evaporation process.

Annealing may be accomplished utilizing the radiation source 34, another overhead annealing lamp, and/or a heater (not shown) of the fabrication bed 24 that is used to pre-heat the build material 16. The additional annealing lamp may be mounted to printing system 20, for example, with the radiation source 34 and/or upon the printing carriage. The additional annealing lamp may be an arc-lamp, a flash lamp, or the like. The layer 14 and the electronic agent 38 thereon may be exposed to annealing in the fabrication bed 24, or the printing system 20 may include an additional bed or platform where annealing takes place.

Annealing takes place for a specified time and at a specified energy output determined, at least in part, by the surfactant(s), solvent system, and/or sintering conditions for the material used in the electronic agent 38. When metal nanoparticles are used in the electronic agent 38, annealing may also be dependent upon the particle size and/or a ligand system associated with then nanoparticles. Annealing may take place at a temperature below the melting temperature of the build material 16, but at a temperature that is suitable to evaporate the aqueous formulation (water, co-solvent, and in some instances surfactant), or to enhance or activate the material in the electronic agent 38. Annealing may also take place at a temperature at or above the melting temperature of the build material 16 (which may range from 50° C. to 2000° C. depending upon the build material 12). At temperatures higher than the melting temperature of the build material 16, the build material 16 may melt, which is acceptable. Following this type of higher temperature anneal, a delay in the print process can be employed to allow for the part 14 to cool before additional build material 16 is supplied for the next layer. In other instances, the temperature rise may be quick, which is useful to cause annealing but leaves the build material 16 largely unaffected (in terms of exhibiting a similar temperature rise).

The following are a few examples of the annealing process. When annealing is utilized to drive off solvent (e.g., water and co-solvent) and/or surfactant(s), relatively low temperatures (about 350° C. or less) may be utilized. When the electronic agent 38 includes graphene, the annealing temperature may be less than 150° C. When the electronic agent 38 includes small metal nanoparticles (e.g., diameter$\leq$10 nm) or nanoparticles with weakly bound ligands, the annealing temperature may be about 200° C. or less. At these temperatures, the small metal nanoparticles or nanoparticles with weakly bound ligands are capable of sintering and becoming electronically active. When the electronic agent 38 includes silver nanoparticles, the annealing temperature may be greater than 100° C. Larger metal nanoparticles may require higher temperatures and/or longer annealing times.

During annealing, the resistance of the electronic component 12 may be monitored to determine the minimum time for obtaining the suitable electronic property.

Some examples of the electronic agents 38 that are thermal inkjet jettable and the corresponding annealing utilized with the electronic agents are shown in Table 1.

TABLE 1

| Electronic Agent | Formulation | Annealing Conditions |
|---|---|---|
| Silver Nanoparticle Ink | 86 wt % METALON ® Ink: Silver* and 14 wt % aqueous formulation** | >150° C. and/or light |
| PEDOT:PSS Ink | 86 wt % PEDOT:PSS (0.8 wt % in water) and 14 wt % aqueous formulation** pH adjusted to 9 | 50° C.-110° C. |
| Graphene Ink | 3 wt % Nano99 powder***; 2.5 wt % JONCRYL ® 683 resin****; 14 wt % aqueous formulation**; and 80.5 wt % additional water | <150° C. |
| Carbon Nanotube Ink***** | Aqueous based ink including ~0.1 wt % carbon nanotubes | <150° C. |

*Available from Novacentrix
**Aqueous formulation includes: 1 wt %-50 wt % 2-pyrrolidinone, 0.1 wt %-5 wt % anti-kogation agent, 0.1 wt %-5 wt % biocide, 0.01 wt %-5 wt % other additives, balance of DI water
***Available from Asbury Online
****Available from BASF Corp.
*****TUBALL ™ Ink available from OCSiAl As previously mentioned, chemical treatment may be used to enhance the electronic property and/or to activate the electronic property. An example of the chemical treatment involves ligand destabilization of nanoparticles having ligands weakly bound thereto. Ligand destabilization removes the ligands from the metal nanoparticles to enhance sintering. Examples of ligand destabilizers include sodium chloride and potassium iodide. Another example of the chemical treatment is doping. Doping may enhance the electronic property. Benzyl viologen and sodium azide may be suitable dopants for the carbonaceous materials. Another example of the chemical treatment is a reduction process. Reducing agent(s), such as hydrazine, sodium borohydride, formaldehyde, etc., may be used to reduce metal salts or metal oxide nanoparticles.

The thickness of the electronic component 12 (or portion thereof) may be built up by applying more of the electronic agent 38 on the previously applied electronic agent 38. In some instances, after each application of the electronic agent, 38, the electronic agent may be exposed to annealing. These processes may be repeated until a desirable thickness of the electronic component 12 is achieved. If annealing is not desired or required, the deposited electronic agent 38 may be allowed to dry before a subsequent layer of the electronic agent 38 is selectively applied thereon. The electronic agent 38 may also be deposited layer by layer until a suitable thickness is achieved, and a single annealing step (if desired or required) may be performed. In an example, the electronic agent 38 may be applied in an amount ranging from about 0.1 picoliters to about 36 picoliters per pixel at 600 dots per inch.

While FIG. 1C illustrates the selective application of one electronic agent 38, it is to be understood that several (e.g., two, three, four, etc.) different electronic agents 38 may be selectively applied to different areas of the layer 14 to form different portions of the electronic component 12 (e.g., a conducting portion and an insulating portion of a capacitor). Also, several different electronic agents 38 may also be selectively applied to the same area of the layer 14 to form at least a portion of the electronic component 12. The use of several different electronic agents 38 in the same area may enhance the electronic properties of the electronic component 12.

Examples of the electronic component 12 that may be formed include conductors, insulators, resistors, capacitors, inductors, memristors, diodes, transistors, rectifiers, transducers, relays, chemical or electronic sensors, transformers, antennas, radio frequency identifiers (RFID), batteries, switches, light emitting diodes (LED), thermoelectric devices, piezo-responsive devices, photovoltaics, or the like.

An example of the device 10, including the 3D printed layer 14 and electronic component 12 formed thereon, is shown in FIG. 2. The electronic component 12 shown in FIG. 2 may be referred to as a "horizontal feature," in part because it is printed on the top most (or horizontal) surfaces of voxels of the layer 14.

Figure 1D:
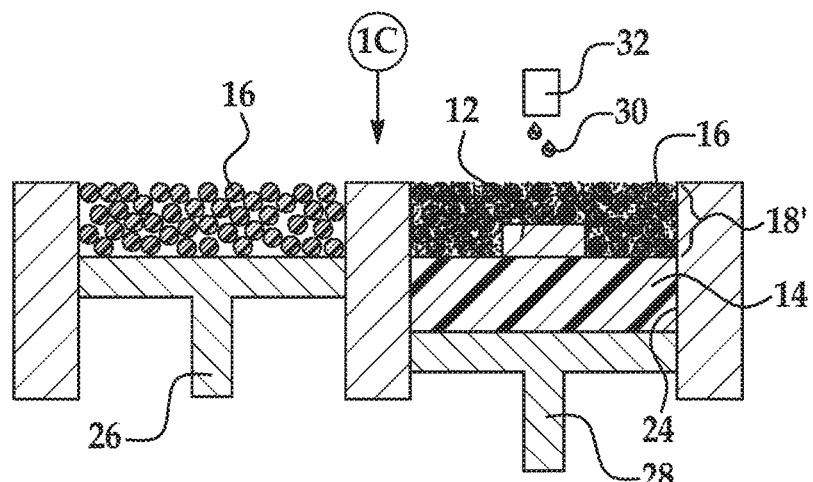
Figure 1E:
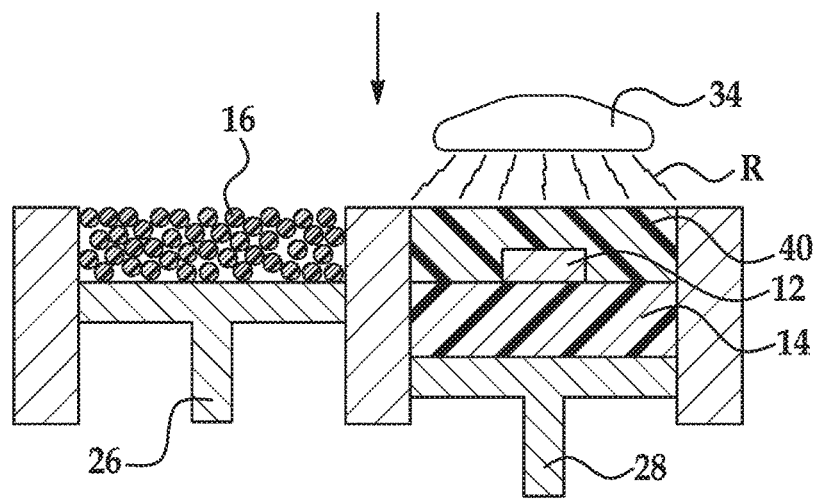
Figure 3A:
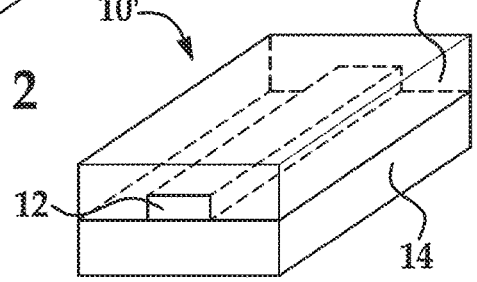
FIGS. 3A and 3B are perspective views depicting other examples of a device with 3D printed electronics formed by the method shown in FIGS. 1A-1E.

In some examples of the method, the electronic component 12 may be at least partially embedded in another layer of the 3D object/part. An example of this is shown in FIGS. 1D and 1E. The example method shown in FIGS. 1D and 1E at least partially embeds the electronic component 12 in the additional layer 40 (shown in FIG. 1E). The resulting device 10' is shown in FIG. 3A.

As shown in FIG. 1D an additional layer 18' of build material 16 is applied on the layer 14 and on the electronic component 12. The additional layer 18' may be added in a similar manner as the layer 18 (described in FIG. 1A). The fusing agent 30 may then be selectively applied to the additional layer 18' of build material 16 anywhere that the additional layer 18' is to be fused. As shown in FIG. 1D, the fusing agent 30 is applied over all of the build material 16 in the additional layer 18'. The fusing agent 30 could also be selectively applied so that a portion of the build material 16 does not fuse.

As shown in FIG. 1E, the additional layer 18' and fusing agent 30 are exposed to the radiation R, which fuses the build material 16 (in the additional layer 18' and in contact with the fusing agent 30) to form the layer 40.

It is to be understood that heat absorbed, during the application of energy, by the build material 16 in the additional layer 18' on which fusing agent 30 has been delivered or has penetrated may propagate to a previously solidified layer, such as layer 14, causing at least some of that layer 14 to heat up above its melting point. This effect helps create strong interlayer bonding between adjacent layers 14, 40 of the device 10'.

Figure 3B:
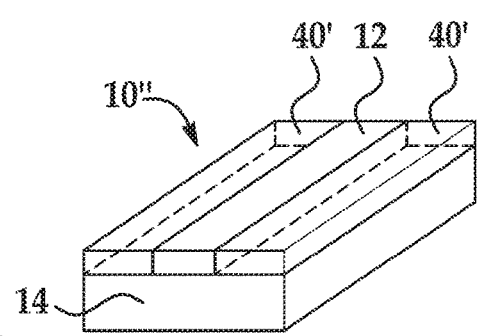

Rather than covering the electronic component 12 and the exposed surfaces of the layer 14 with additional build material 16 (as shown in FIG. 1D), the build material 16 may be delivered to the exposed surface(s) of the layer 14 and adjacent to the side(s) of the electronic component 12, but not over the electronic component 12. This forms an additional layer 18' of the build material 16 that does not completely cover the electronic component 12 (i.e., the top surface of the electronic component remains exposed). The fusing agent 30 may then be selectively applied to the additional layer 18' of build material 16 anywhere that the additional layer 18' is to be fused. The additional layer 18' and fusing agent 30 are exposed to the radiation R, which fuses the build material 16 (in the additional layer 18' and in contact with the fusing agent 30). An example of the layer 40' and the device 10" formed via this example of the method is shown in FIG. 3B. The layer 40' surrounds two sides of the electronic component 12, but does not completely encapsulate the electronic component.

Figure 4A:
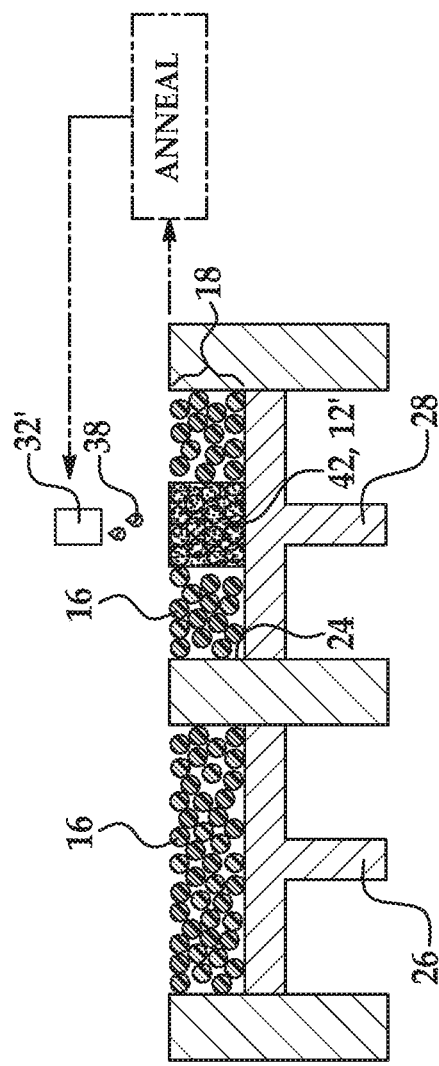
FIGS. 4A-4C are cross-sectional views depicting another example of the method for forming 3D printed electronics.

Referring now to FIGS. 4A through 4C and 4A, 4D and 4E, two other examples of the method for forming 3D printed electronics are shown. As shown in FIG. 4A, the methods include applying the build material 16. As depicted, one layer 18 of the build material 16 has been applied. The build material 16 may be applied using the printing system 20. The build material 16 may also be pre-heated in the fabrication bed 24.

Also as shown in FIG. 4A, the electronic agent 38 is selectively applied on at least a portion of the build material 16. Any of the electronic agents 38 previously described may be applied, depending upon the electronic property that is to be imparted and/or the electronic component(s) 12' (see FIGS. 4C and 4E) that is/are to be formed. A single electronic agent 38 may be applied in a suitable pattern or two or more electronic agents 38 may be applied in different patterns to form different portions of the electronic component(s) 12' that is/are to be formed.

The application of the electronic agent(s) 38 forms a build material portion 42 having the electronic property. The electronic agent(s) 38 may be applied in a single pass or in multiple passes using the printhead 32'. The thickness of the build material portion 42 may be increased as more electronic agent(s) 38 is applied. In an example, the electronic agent 38 may be applied in an amount up to about 200 picoliters per pixel at 600 dots per inch and with a build material thickness of up to about 100 µm.

After each pass, or after the desired amount of the electronic agent 38 is applied to the build material 16, the build material 16 and the electronic agent 38 may be exposed to a treatment (e.g., annealing, chemical treatment, etc.) to accelerate evaporation of the aqueous formulation, to enhance the electronic property, and/or to activate the electronic property. In other examples, before or during each pass, the electronic agent 38 may be exposed to a chemical treatment to enhance the electronic property and/or to activate the electronic property. It is to be understood that some electronic agents 38 have an aqueous formulation that evaporates upon being dispensed, and also do not require property enhancement or activation, and thus the treatment may not be performed with all of the electronic agents 38. Annealing takes place at any suitable temperature, depending, at least in part, on the surfactant(s), solvent system, and/or sintering conditions for the material used in the electronic agent 38.

In some examples, the electronic agent 38 occupies such a small space that there is little build material 16 within the volume of the electronic agent 38. In other examples, the electronic agent 38 occupies enough space that there is a significant amount of build material 16 within the volume. The dried electronic agent 38 is capable of holding the build material 16 in contact therewith together. In the example shown in FIG. 4A, the build material portion 42 is an electronic via (one example of the electronic component 12') that extends through the thickness of the build material layer 18.

Figure 4B:
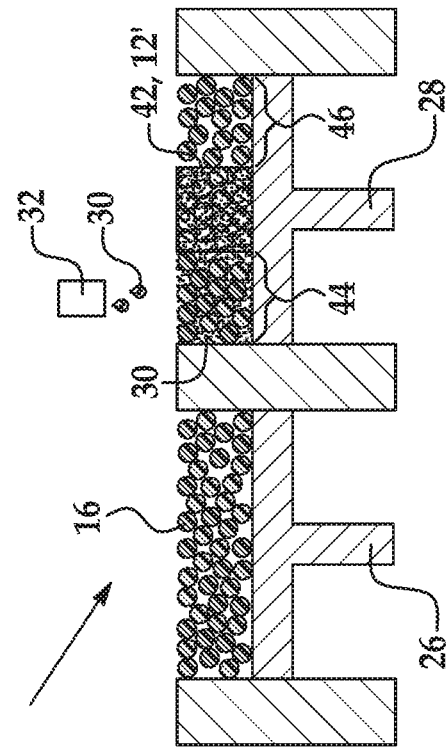
Figure 4D:
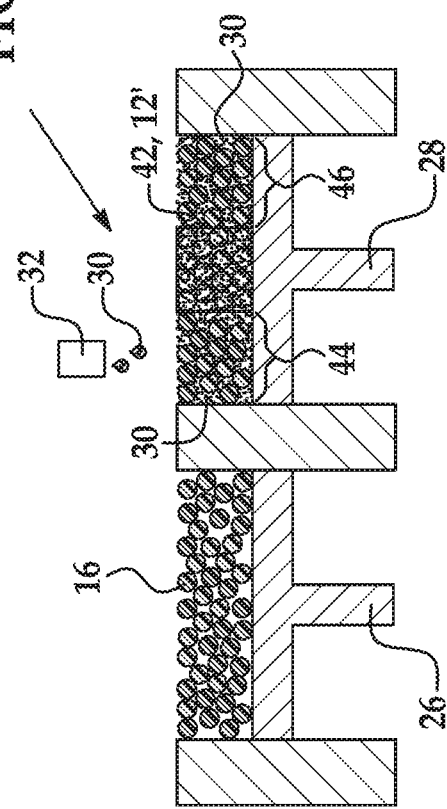

As shown in both FIGS. 4B and 4D, the fusing agent 30 is then selectively applied on other portion(s) 44, 46 of the build material 16. Any of the previously described fusing agents 30 may be used, and the fusing agent 30 may be selectively applied using the printhead 32. In the example shown in FIG. 4B, the fusing agent 30 is selectively applied to all of the build material 16 (in both portions 44 and 46), except on the build material portion 42. In other words, the fusing agent 30 is applied to all of the build material 16 around the build material portion 42. In the example shown in FIG. 4D, the fusing agent 30 is selectively applied to the portion 44 of the build material 16, while the portion 46 of the build material 16 remains untreated. It is to be understood that portion 46 could have the fusing agent 30 applied thereto and portion 44 could remain untreated. Still further, the fusing agent 30 may be applied in any suitable pattern on the portion(s) 44, 46 around the build material portion 42.

Figure 4C:
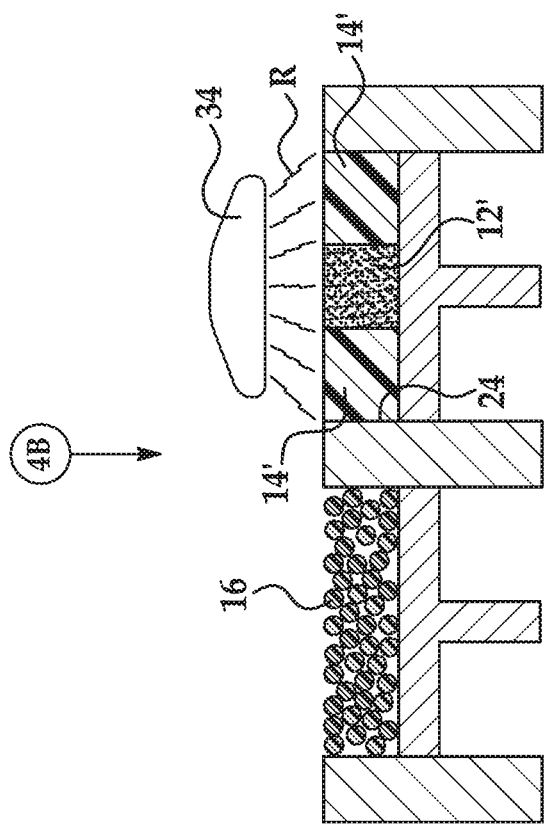
Figure 4E:
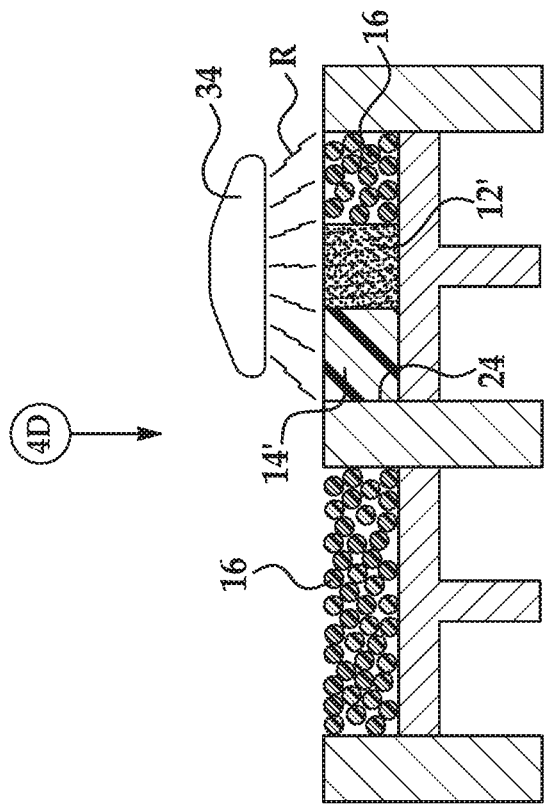

As shown in both FIGS. 4C and 4E, after the fusing agent 30 is selectively applied in the specific portion(s) 44 and/or 46, the entire layer 18 of the build material 16 is exposed to radiation R. The radiation R is emitted from the radiation source 34, which may be any of the example radiation sources described herein. The fusing agent 30 enhances the absorption of the radiation R, converts the absorbed radiation to thermal energy, and promotes the transfer of the thermal heat to the build material 16 in contact therewith. In an example, the fusing agent 30 sufficiently elevates the temperature of the build material 16 above the melting point(s), allowing curing (e.g., sintering, binding, fusing, etc.) of the build material particles to take place.

Figure 5A:
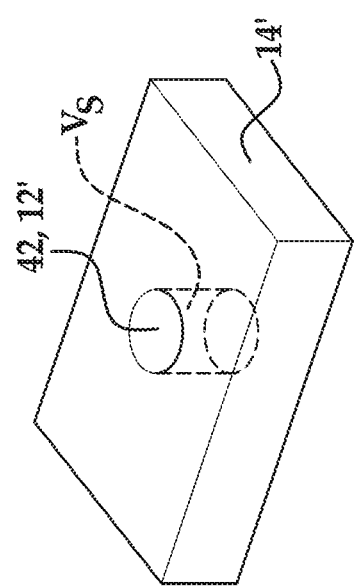
FIGS. 5A and 5B are perspective views depicting examples of devices with 3D printed electronics formed, respectively, by the method shown in FIGS. 4A-4C and the method shown in FIGS. 4A, 4D and 4E.
Figure 5B:
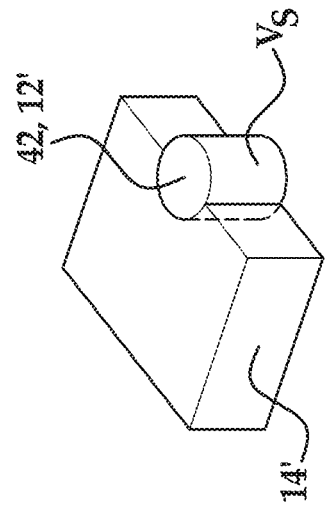

Exposure to radiation R forms a layer 14' of the 3D object/part. In the example shown in FIGS. 4C and 5A, the layer 14' surrounds the vertical surface(s) Vs of the electronic component 12' while the top surface remains exposed. The electronic component 12' shown in FIG. 5A may be referred to as an "embedded vertical feature," in part because it is printed within the volume of the voxels of the build material 16 and the vertical surface Vs of the electronic component 12' are not exposed in the final device. In the example shown in FIGS. 4E and 5B, the layer 14' surrounds some of the vertical surface(s) Vs of the electronic component 12' while some other of the vertical surface(s) Vs and the top surface remain exposed. The electronic component 12' shown in FIG. 5B may be referred to as a "surface vertical feature," in part because it is printed within the volume of the voxels of the build material 16 and a portion of the vertical surface $V_S$ of the electronic component 12' is exposed in the final device.

Referring back briefly to FIG. 4E, the portion 46 of the build material 16 that does not have the fusing agent 30 applied thereto does not absorb enough energy to fuse. Any unfused build material 16 may be removed from the layer 14' and the electronic component 12' that are formed. It is to be understood that if any unfused build material 16 remains in the fabrication bed 24 in FIG. 4C, it can also be removed from the layer 14' and electronic component 12' that are formed.

Figure 6A:
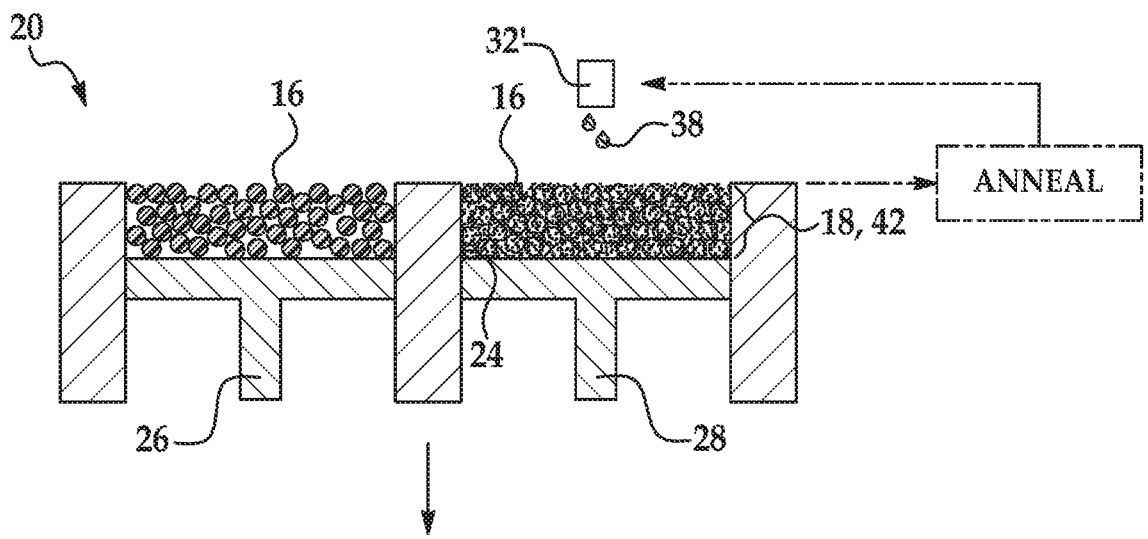
FIGS. 6A through 6C are cross-sectional views depicting another example of the method for forming 3D printed electronics.
Figure 6B:
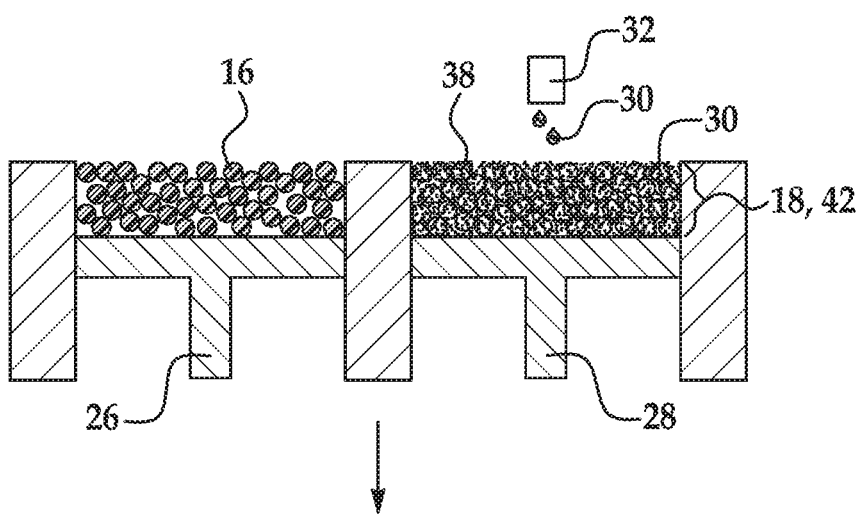
Figure 6C:
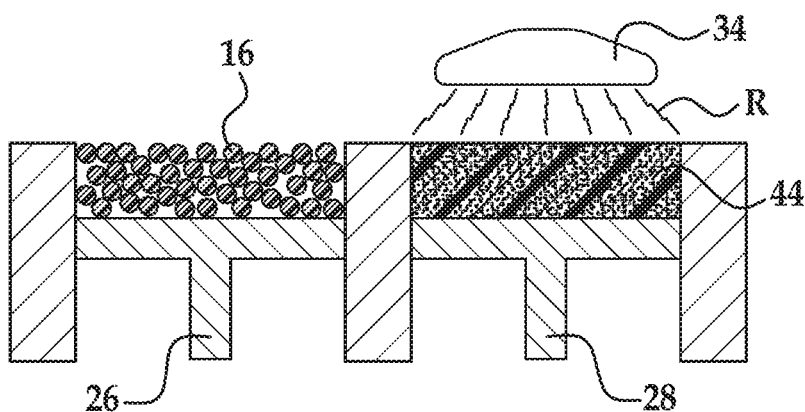

Referring now to FIGS. 6A through 6C, still another example of the method for forming 3D printed electronics is shown. As shown in FIG. 6A, the method includes applying the build material 16. As depicted, one layer 18 of the build material 16 has been applied. The build material 16 may be applied using the printing system 20. The build material 16 may also be pre-heated in the fabrication bed 24.

Also as shown in FIG. 6A, the electronic agent 38 is selectively applied on at least a portion of the build material 16. In the example shown in FIG. 6A, the electronic agent 38 is applied to all of the build material 16, although it could be applied to less than all of the build material 16. Any of the electronic agents 38 previously described may be applied, depending upon the electronic property that is to be imparted. A single electronic agent 38 may be applied in a suitable pattern or two or more electronic agents 38 may be applied in different patterns.

The application of the electronic agent(s) 38 forms a build material portion 42 having the electronic property. The electronic agent(s) 38 may be applied in a single pass or in multiple passes using the printhead 32'. The thickness of the build material portion 42 may be increased by adding additional electronic agent 38.

After each pass, or after the desired amount of the electronic agent 38 is applied to the build material 16, the build material 16 and the electronic agent 38 may be exposed to a treatment (e.g., annealing, chemical treatment, etc.) to accelerate evaporation of the aqueous formulation, to enhance the electronic property, and/or to activate the electronic property. In other examples, before or during each pass, the electronic agent 38 may be exposed to a chemical treatment to enhance the electronic property and/or to activate the electronic property. It is to be understood that some electronic agents 38 have an aqueous formulation that evaporates upon being dispensed, and also do not require property enhancement or activation, and thus the treatment may not be performed with all of the electronic agents 38. Annealing takes place at any suitable temperature, depending, at least in part, on the surfactant(s), solvent system, and/or sintering conditions for the material used in the electronic agent 38.

As shown in FIG. 6B, the fusing agent 30 is then selectively applied on the same portion of the build material 16 to which the electronic agent 38 is applied. Any of the previously described fusing agents 30 may be used, and the fusing agent 30 may be selectively applied using the printhead 32.

As shown in FIG. 6C, after the fusing agent 30 is selectively applied, the entire layer 18 of the build material 16 is exposed to radiation R. The radiation R is emitted from the radiation source 34, which may be any of the example radiation sources described herein. The fusing agent 30 enhances the absorption of the radiation R, converts the absorbed radiation to thermal energy, and promotes the transfer of the thermal heat to the build material 16 in contact therewith. In an example, the fusing agent 30 sufficiently elevates the temperature of the build material 16 above the melting point(s), allowing curing (e.g., sintering, binding, fusing, etc.) of the build material particles to take place.

Exposure to radiation R forms a layer 44 of the 3D object/part having the electronic property of the electronic agent 38 imparted thereto. The layer 44 may be referred to as a "volume feature," in part because the electronic property is imparted throughout at least a portion of the volume of the layer 44 that is formed. This volume approach is useful for creating scratch resistant static-dissipative or antistatic parts.

Any unfused build material 16 may be removed from the layer 44.

While all of the build material 16 in the fabrication bed 24 is shown forming the layer 44 in FIGS. 6A-6C, it is to be understood that the electronic agent 38 and the fusing agent 30 may be applied to the same portion of the build material 16 which makes up less than all of the build material 16 in the layer 18. The remaining untreated build material 16 in the layer 18 (i.e., which doesn't have either the electronic agent 38 or the fusing agent 30 thereon) may be left untreated and may be removed after fusing. The remaining untreated build material 16 in the layer 18 (i.e., which doesn't have either the electronic agent 38 or the fusing agent 30 thereon) may also be patterned with the fusing agent 30 alone in order to define a layer 14, 14' that partially or fully surrounds the volume feature layer 44 after fusing.

Still further, in the example of the method shown in FIGS. 6A-6C, annealing conditions that are separate from the fusing conditions may not be not required. For example, if the electronic agent 38 requires no activation and the solvent(s) and/or surfactants of the electronic agent 38 may be driven off under the fusing conditions, the annealing may be skipped. The electronic agent 38 and the fusing agent 30 may be selectively applied simultaneously, and then exposed to the radiation R. Radiation exposure (without additional annealing) will form the layer 44 as well as drive off any solvent.

The electronic agent 38 including the conductive material, the semiconductive material, or the material whose electronic property is enhanced or activated when exposed to treatment may function similar to the fusing agent or be used as (i.e., in place of) the fusing agent 30. When the electronic agent 38 functions as a fusing agent 30 or is used in place of the fusing agent 30, the electronic property may be imparted to the bulk of the layer(s) (e.g., layer 14, 40, etc.) and the electronic agent 38 may actually aid in fusing the build material 16 upon which it is applied. For example, in FIG. 4A, if the electronic agent 38 functions as a fusing agent, the build material portion 42 may fuse during the annealing. As such, the electronic agent 38 may be selected as the fusing agent 30 when it is desirable to impart a particular electronic property to the layer(s) that are being fused. As such, the electronic agent 38 may also work as a fusing agent 30 and melt the build material 16; or the electronic agent 38 may not work as a fusing agent 30 and either thermal bleed from the surrounding areas fuses the build material 16 with electronic agent 38 thereon or the build material 16 having electronic agent 38 thereon simply becomes lightly fused, being held together by the dried electronic agent 38.

To further illustrate the present disclosure, examples are given herein. It is to be understood that these examples are provided for illustrative purposes and are not to be construed as limiting the scope of the present disclosure.

EXAMPLES

Example 1

A layer (100 μm thick) of polyamide-12 (PA-12) build material was applied to a fabrication bed and was pre-heated 150° C. Silver nanoparticle ink (86 wt % METALON® Ink: Silver* and 14 wt % aqueous formulation) was used as the fusing agent. The aqueous formulation included 1 wt %-50 wt % 2-pyrrolidinone, 0.1 wt %-5 wt % anti-kogation agent, 0.1 wt %-5 wt % biocide, 0.01 wt %-5 wt % other additives, and a balance of DI water. The silver nanoparticle ink was thermal inkjet printed with a 9 ng printhead on the PA-12 layer. The PA-12 (with silver nanoparticle ink applied thereto) was subjected to selective fusion with a 300 W halogen light bulb using a prototype Multi jet Fusion™ Machine (Hewlett Packard). This process was repeated 4 more times to form a part with 5 fused layers (total thickness ~500 μm).

5 layers of silver nanoparticle ink was jetted directly onto the surface of the part, creating a surface horizontal feature. The thin film on the top of the part was not conductive when initially taken off the build bed, but became conductive when the entire part was annealed in an oven at 150° C. for 4 hours. For the thin film, the measured sheet resistance was ~120 Ohms/sq with a bulk conductivity of ~20,000 Siemens/m. The underlying part was not conductive.

Example 2

Four commercially available electronic inks were tested. Three of the four inks were mixed with an aqueous formulation, which included 1 wt %-50 wt % 2-pyrrolidinone, 0.1 wt %-5 wt % anti-kogation agent, 0.1 wt %-5 wt % biocide, 0.01 wt %-5 wt % other additives, and a balance of DI water to form the electronic agent. The fourth commercially available ink (i.e., the carbon nanotube ink shown in Table 2) was used as received (i.e., was not mixed with the aqueous formulation). A graphene based electronic agent was also prepared with 3 wt % Nano99 powder, 2.5 wt % JON-CRYL® 683 resin, 14 wt % of the aqueous formulation, and 80.5 wt % additional water. Table 2 illustrates the commercially available inks that were used, the advertised conductivity, and the concentration in the aqueous thermal inkjet vehicle.

TABLE 2

| Ink # | Commercially Available Ink | Concentration in TIJ Vehicle | Advertised Conductivity |
|---|---|---|---|
| 1 | METALON ® Ink: Silver | 25 wt % (~2.5 vol %) | 0.01 Ω/sq, $10^7$ S/m |
| 2 | PEDOT:PSS (0.8 wt % in water) | 1.0 wt % | 50-120 Ω/sq, 1000 S/m |
| 3 | XG Sciences Graphene Ink | Up to 8 wt % | 10 Ω/sq, 100 S/m |
| 4 | TUBALL ™ Ink (0.1 wt % Carbon Nanotube Ink) | N/A | 100 Ω/sq |

Experiment 1

For this experiment, ~30 μL of each of inks 1, 2, 3, 4, and the in-house graphene ink were spotted on one side of a silicon substrate (~15 mm in width and ~40 mm in length). A draw-down rod (#11 wire, ~30 μm liquid film) was used to spread the ink upon the silicon substrate. The substrates were annealed under different conditions, as shown in Table 3. Resistance measurements were taken of the films to obtain sheet resistance and resistivity.

TABLE 3

| Sample | Ink # | Annealing Conditions | Advertised Resistance (σ or S/m) | Measured Resistance (σ or S/m) | Advertised Resistivity (Ω/sq) | Measured Resistivity (Ω/sq) |
|---|---|---|---|---|---|---|
| A | 1 | 175° C., 7 hrs | $10^7$ S/m | $10^6$ S/m | 0.1 Ω/sq | 0.5 Ω/sq |
| B | 2 | 50° C., 10 min | 1000 S/m | 1000 S/m | 50-120 Ω/sq | 100 Ω/sq |
| C1 | in-house graphene | 50° C., 10 min | 100 S/m* | 10 S/m | 10 Ω/sq* | 100,000 Ω/sq |
| C2 | 3 | 50° C., 10 min | 100 S/m | No measurable resistance | 10 Ω/sq* | No measurable resistivity |
| D | 4 | Air dried | 10,000 S/m | 10,000 S/m | 100 Ω/sq | 1000 Ω/sq |

*Advertised values of commercially available graphene ink

The films created on the silicon substrates were used to establish a baseline for films formed on other surfaces, as described in experiments 2-5. By using drying/annealing conditions similar to those recommended by the ink suppliers, films with sheet resistances and resistivities within an order of magnitude of the supplier spec were able to be created for inks 1, 2, and 4. The films formed with the in-house graphene ink and ink 3 did not correspond with advertised values, however, this may be due to the fact that graphene in the ink is not in a fully crystallized form. The graphene structure may be deformed, which could degrade the electronic properties. The graphene ink may be suitable for forming a resistor or a heater.

Experiment 2

For this experiment, ~30 μL of each of inks 1, 2, 3 and 4 was spotted on one side of a PA 12 surface. A draw-down rod (#11 wire, ~30 μm liquid film) was used to spread the ink upon the PA 12 surface. The substrates were annealed under different conditions, as shown in Table 4. Resistance measurements were taken of the films to obtain sheet resistivity.

TABLE 4

| Sample | Ink # | Annealing Conditions | Advertised Resistivity (Ω/sq) | Measured Resistivity (Ω/sq) |
|---|---|---|---|---|
| E | 1 | 175° C., 8 hrs followed by 145° C., 72 hrs | 0.01 Ω/sq | 1 Ω/sq |
| F | 2 | 175° C., 5 min | 50-120 Ω/sq | 100 Ω/sq |
| G | 3 | 175° C., 5 min | 10 Ω/sq | 1,000,000 Ω/sq |
| H | 4 | 175° C., 5 min | 100 Ω/sq | 1000 Ω/sq |

When applied to PA 12, there was little change in the conductivity for the PEDOT:PSS film (Sample F) and CNT film (Sample H) (when comparing the results from experiment 1), but the Ag NP film (Sample E) lost around an order of magnitude of conductivity (when comparing the results from experiment 1). Even with this loss, the conductivity of Sample E is still the highest among the samples tested.

Experiment 3

For experiment 3, ~30 μL of ink 2 was spotted on one side of a PA 12 surface. A draw-down rod (#11 wire, ~30 μm liquid film) was used to spread the ink upon the PA 12 surface. A second PA 12 surface was applied to sandwich the film. The substrate was annealed. Resistance measurements were taken of the films to obtain sheet resistivity (shown in Table 5).

TABLE 5

| Sample | Ink # | Annealing Conditions | Advertised Resistivity (Ω/sq) | Measured Resistivity (Ω/sq) |
|---|---|---|---|---|
| I | 2 | 210° C., 2 min | 50-120 Ω/sq | 1000-10,000 Ω/sq |

When sandwiched between two PA 12 substrates, the PEDOT:PSS film (Sample I) lost around an order of magnitude of conductivity (when comparing the results from experiments 1 and 2). Even with this loss, the conductivity of Sample I is reasonable.

Experiment 4

For experiment 4, 20 wt % of inks 2 and 4 were mixed with bulk PA 12 powder. The ink/bulk mixture was annealed at 210° C. for 5 minutes. Resistance measurements were taken of the bulk polymer films to obtain bulk resistance (shown in Table 6).

TABLE 6

| Sample | Ink # | Advertised Resistance ($\sigma$ or S/m) | Measured Resistance ($\sigma$ or S/m) |
|---|---|---|---|
| J | 2 | 1000 S/m | 0.001 S/m |
| K | 4 | 10,000 S/m | 0.01 S/m |

With 20 wt % of inks 2 and 4 mixed with bulk PA 12 powder, there was measurable conductivity of the bulk polymer film (~0.5 mm thick), although it was lower than the film measurements in other experiments. However, the volume-based conductivity measured in experiment 5 is sufficient for creating scratch-resistant part surfaces which are anti-static ($10^9$-$10^{12}$ $\Omega$/sq) or static dissipative ($10^6$-$10^9$ $\Omega$/sq).

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

It is to be understood that the ranges provided herein include the stated range and any value or sub-range within the stated range. For example, a range from about 50° C. to about 2100° C. should be interpreted to include not only the explicitly recited limits of about 50° C. to about 2100° C., but also to include individual values, such as 57° C., 95° C., 225° C., 1350° C., etc., and sub-ranges, such as from about 75° C. to about 2025° C., from about 100° C. to about 1900° C., etc. Furthermore, when "about" is utilized to describe a value, this is meant to encompass minor variations (up to +/−10%) from the stated value.

In describing and claiming the examples disclosed herein, the singular forms "a", "an", and "the" include plural referents unless the context clearly dictates otherwise.

While several examples have been described in detail, it is to be understood that the disclosed examples may be modified. Therefore, the foregoing description is to be considered non-limiting.

What is claimed is:

1. A method for forming three-dimensional (3D) printed electronics, the method comprising:
    applying an unfused polymeric powder build material onto a fabrication bed;
    selectively applying, via a first thermal inkjet printhead or a first piezoelectric inkjet printhead, a fusing agent on at least a portion of the unfused polymeric powder build material on the fabrication bed, wherein the fusing agent comprises a water-based dispersion including an infrared light absorbing colorant;
    exposing the unfused polymeric powder build material on the fabrication bed to radiation, thereby fusing the portion of the unfused polymeric powder build material in contact with the fusing agent to form a 3D object layer on the fabrication bed; and
    selectively applying, via a second thermal inkjet printhead or a second piezoelectric inkjet printhead, an aqueous formulation including an electronic agent selected from the group consisting of a semi-conductive material and an insulating material on at least a portion of the 3D object layer on the fabrication bed, thereby imparting semi-conductivity or an electrically insulating property on the at least the portion of the 3D object layer on the fabrication bed;
    wherein the aqueous formulation including the electronic agent includes at least one of: water, a co-solvent, a pH adjuster, or a surfactant.

2. The method as defined in claim 1, further comprising annealing the at least the portion of the 3D object layer.

3. The method as defined in claim 1, wherein:
    prior to the selectively applying of the aqueous formulation including the electronic agent, the method further includes selectively applying, via another thermal inkjet printhead or another piezoelectric inkjet printhead, a first aqueous formulation including a first electronic agent on an area of the at least the portion of the 3D object layer on the fabrication bed, thereby imparting a first electronic property to the area, wherein the first electronic agent is a conductive material;
    the electronic agent is the insulating material and the aqueous formulation including the electronic agent is selectively applied on the first electronic agent, thereby imparting a second electronic property to the area; and
    the first electronic property is conductivity and the second electronic property is the electrically insulating property.

4. The method as defined in claim 1, further comprising at least partially embedding the at least the portion of the 3D object layer by:
    applying additional unfused polymeric powder build material on the 3D object layer;
    applying the fusing agent on at least a portion of the additional unfused polymeric powder build material; and
    exposing the additional unfused polymeric powder build material to radiation, thereby fusing the at least the portion of the additional unfused polymeric powder build material.

5. The method as defined in claim 4 wherein the selectively applying of the fusing agent is accomplished by applying the fusing agent on the at least the portion of the additional unfused polymeric powder build material that does not cover the at least the portion of the 3D object layer having the electronic property.

6. The method as defined in claim 1 wherein:
    prior to the selectively applying of the aqueous formulation including the electronic agent, the method further includes selectively applying a first aqueous formulation including a first electronic agent on a first area of the at least the portion of the 3D object layer on the fabrication bed, thereby imparting a first electronic property to the first area, wherein the first electronic agent is a conductive material;
    the electronic agent is the insulating material and the aqueous formulation including the electronic agent is selectively applied on a second area of the at least the portion of the 3D object layer on the fabrication bed, thereby imparting a second electronic property to the second area; and
    the first electronic property is conductivity and second electronic property is the electrically insulating property.

7. The method as defined in claim 1 wherein the unfused polymeric powder build material is a semi-crystalline thermoplastic material.

8. The method as defined in claim 1 wherein the unfused polymeric powder build material is a polyamide material selected from the group consisting of polyamide 11, polyamide 12, polyamide 6, polyamide 8, polyamide 9, polyamide 66, polyamide 612, polyamide 812, and polyamide 912.

9. The method as defined in claim 3, wherein the conductive material includes a combination of carbon nanotubes, silver nanoparticles and a poly(3,4-ethylenedioxythiophene) polystyrene sulfonate polymer.

10. The method as defined in claim 1, wherein:
the electronic agent is the semi-conductive material; and
the semi-conductive material includes a combination of quantum dots and semi-conducting polymers.

11. The method as defined in claim 1, wherein:
the electronic agent is the insulating material; and
the insulating material is selected from the group consisting of hexagonal boron nitride, a metal oxides, a metal nitride, a metal alkoxide, a metal chloride, silicate, polylactic acid, a fluoropolymer, polycarbonate, an acrylic polymer, polystyrene, benzocyclobutane, and a paraffin.

12. The method as defined in claim 3, wherein the conductive material is selected from the group consisting of graphene and carbon nanotubes and is present in the first aqueous formulation in an amount ranging from about 0.1 wt % to about 3 wt %.

13. The method as defined in claim 6, wherein the conductive material is selected from the group consisting of graphene and carbon nanotubes and is present in the first aqueous formulation in an amount ranging from about 0.1 wt % to about 3 wt %.

* * * * *